United States Patent [19]

Sjostedt et al.

[11] Patent Number: 5,730,485
[45] Date of Patent: Mar. 24, 1998

[54] CARGO TRANSPORT VEHICLE FLOOR ASSEMBLY

[75] Inventors: Robbie J. Sjostedt, Oregon; Brent G. Schaffer, Janesville, both of Wis.

[73] Assignee: Stoughton Composites, Inc., Brodhead, Wis.

[21] Appl. No.: 472,147

[22] Filed: Jun. 7, 1995

[51] Int. Cl.$^6$ .................................................. B62D 25/20
[52] U.S. Cl. ........................... 296/182; 296/183; 296/191; 105/422
[58] Field of Search ................................. 296/181, 182, 296/183, 191, 901; 105/375, 422; 220/1.5; 52/309.15, 143

[56] References Cited

U.S. PATENT DOCUMENTS

| | | | |
|---|---|---|---|
| 2,962,323 | 11/1960 | McBride | 296/28 |
| 3,003,199 | 10/1961 | Talmey | 20/4 |
| 3,003,810 | 10/1961 | Kloote et al. | 296/31 |
| 3,563,403 | 2/1971 | Luisada | 220/1.5 |
| 4,491,362 | 1/1985 | Kennedy | 296/183 |
| 4,531,278 | 7/1985 | Boykin | 29/469 |
| 4,703,948 | 11/1987 | Ehrlich | 280/782 |
| 4,730,428 | 3/1988 | Head et al. | 82/300 |
| 4,838,605 | 6/1989 | Abromavage | 296/182 |
| 4,861,095 | 8/1989 | Zajic | 296/182 |
| 4,940,279 | 7/1990 | Abbott et al. | 296/181 |
| 4,951,479 | 8/1990 | Araquistain et al. | 62/239 |
| 4,951,992 | 8/1990 | Hockney | 296/204 |
| 4,976,490 | 12/1990 | Gentle | 296/183 |
| 5,054,843 | 10/1991 | Gray | 296/191 |
| 5,150,944 | 9/1992 | Yoshida et al. | 296/203 |
| 5,178,292 | 1/1993 | Korzeniowski | 220/1.5 |
| 5,255,806 | 10/1993 | Korzeniowski et al. | 220/1.5 |
| 5,403,063 | 4/1995 | Sjostedt et al. | 296/187 |
| 5,509,715 | 4/1996 | Scharpf | 296/181 |

*Primary Examiner*—Joseph D. Pape
*Attorney, Agent, or Firm*—Michael Best & Friedrich LLP

[57] ABSTRACT

The invention provides a floor assembly for replacing oak board floor constructions. The floor assembly includes floor boards that are installed in the same manner as oak floor boards, but that are made of more readily available materials. In one embodiment the floor boards are made of an inexpensive wood material core encased in a shell made of fiber reinforced plastic composite material. The core and the fiber reinforced plastic composite material are co-pultruded so that the shell integrally bonds to the core member and provides a seamless protective skin for the core member.

19 Claims, 3 Drawing Sheets

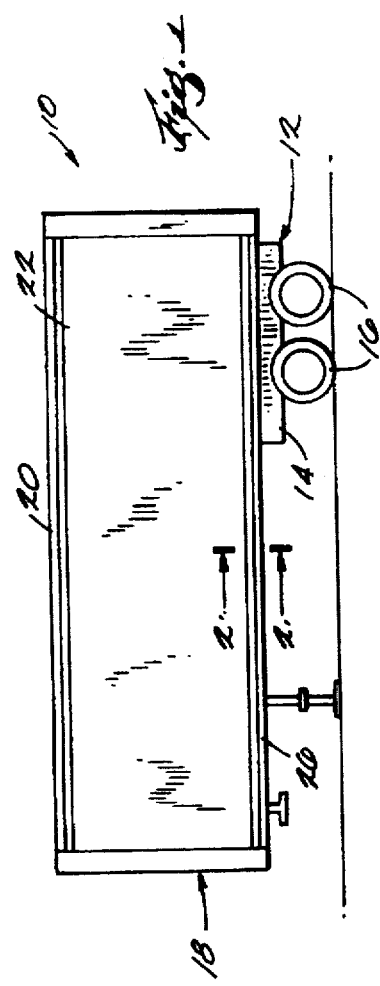
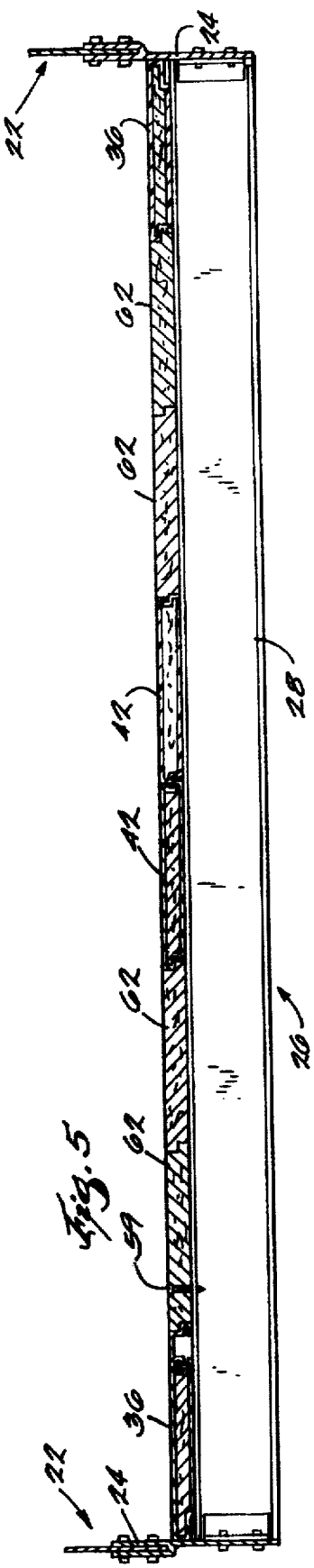
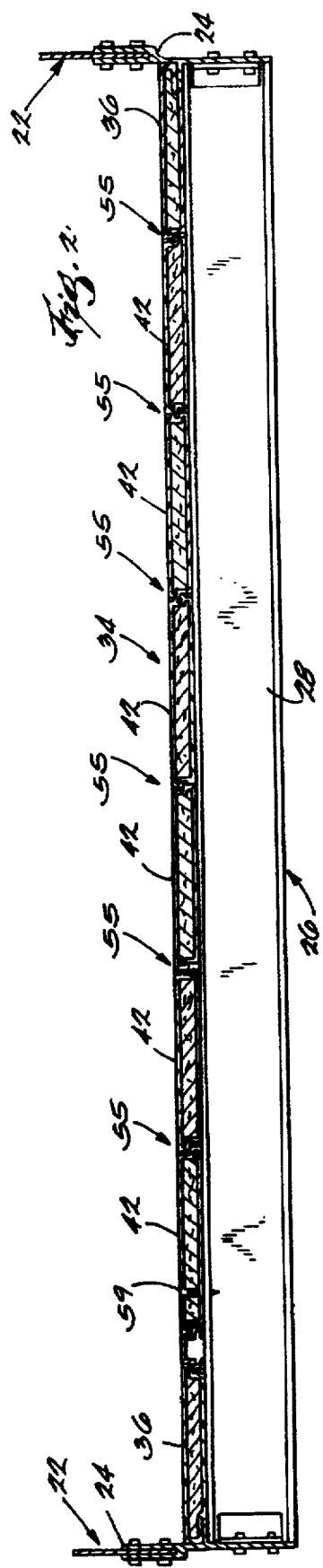

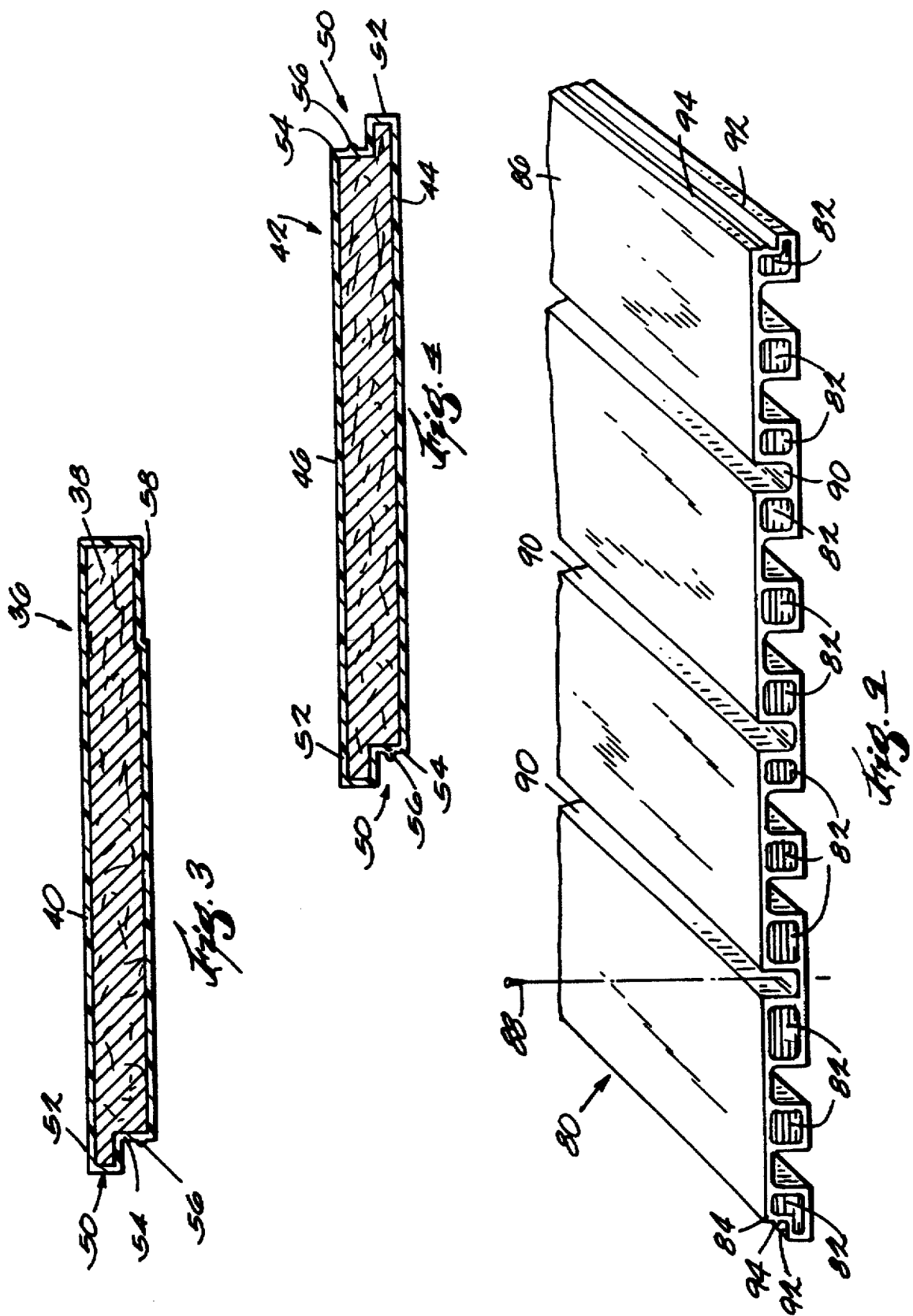

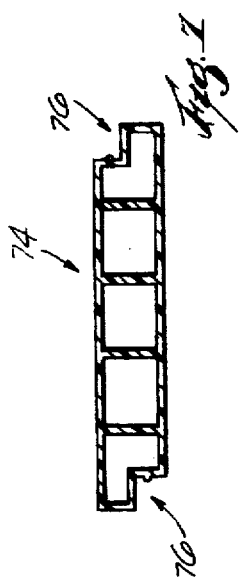
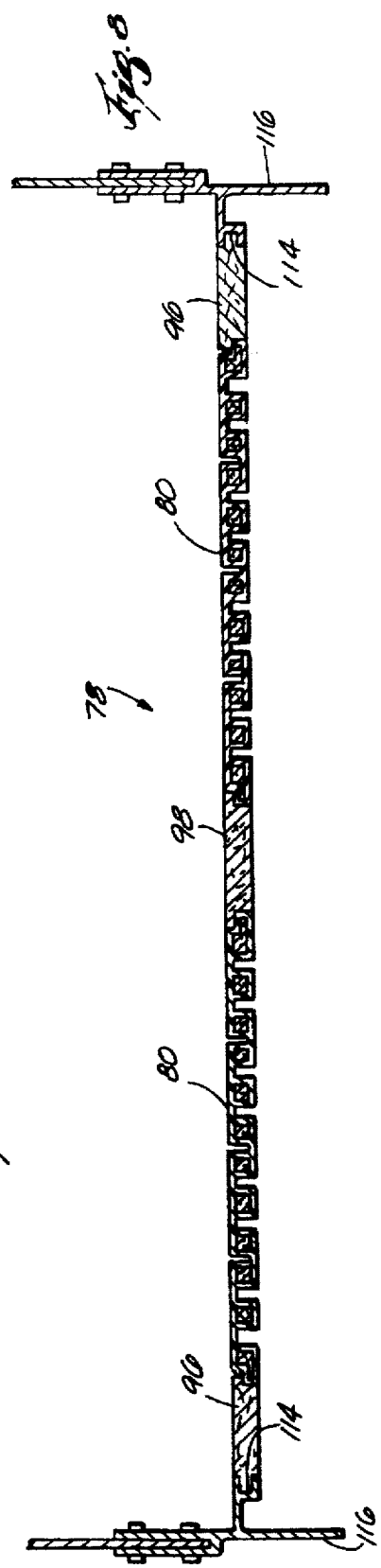
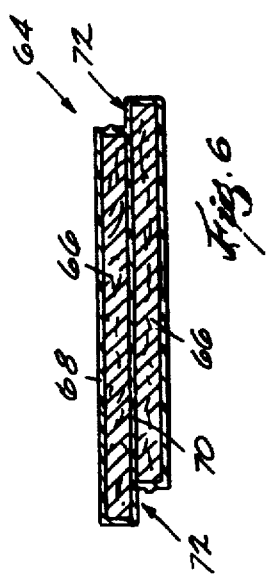
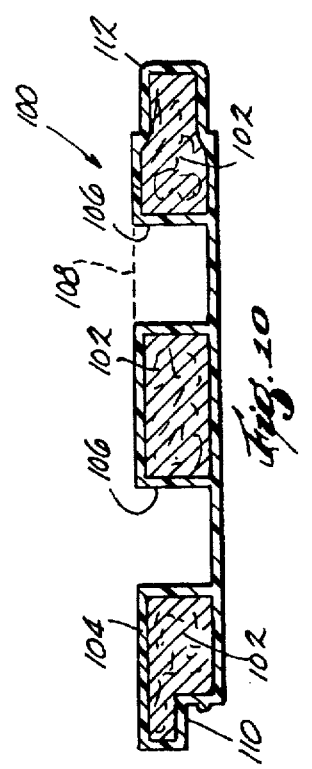
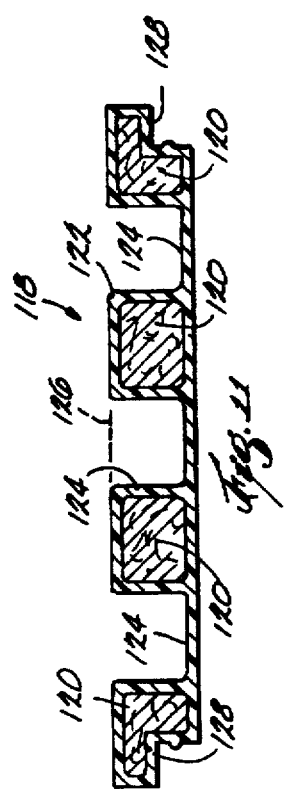

CARGO TRANSPORT VEHICLE FLOOR ASSEMBLY

FIELD OF THE INVENTION

The invention relates generally to cargo transport vehicle bodies such as trailer bodies, shipping containers, truck bodies, rail car bodies and the like, and more particularly to floor constructions for those vehicle bodies.

REFERENCE TO PRIOR ART

Vehicle bodies having floor constructions made primarily from metallic materials or fiber reinforced plastic materials are known in the art. For example, U.S. Pat. No. 5,255,806 illustrates an intermodal shipping container including a bottom wall made of fiber reinforced plastic panels that are adhesively bonded together and that are interconnected in a lateral direction. U.S. Pat. No. 3,003,810 also illustrates a trailer including a floor constructed of panels that are adhesively bonded in a lateral direction. Each of those panels has a central core sandwiched between plywood sublaminae, the exposed faces of which are covered by skins. U.S. Pat. No. 2,962,323 illustrates a trailer including interconnected floor panels that each include a STYROFOAM body sandwiched between fiberglass coverings. The forgoing floor constructions are suitable for particular applications, but do not enjoy the widespread acceptance and use of conventional oak (or comparable wood) floor constructions. Reasons for this lack of acceptance include the time, labor and cost involved in those alternative floor constructions, and the superior mechanical properties of oak floor constructions, among others.

An example of a conventional oak floor construction for trailers, intermodal shipping containers and truck bodies is illustrated in U.S. Pat. No. 4,703,948. That floor construction includes a plurality of longitudinally extending and interfitting wood floor boards screwed to steel crossmembers that extend laterally underneath the floor. Oak is a preferred floor board material due to its superior bending and compressive strengths, durability, and ability to hold fasteners. However, oak and other potentially acceptable tree species are becoming increasingly scarce. As oak and other acceptable tree stocks dwindle the price of floor boards made from those trees will continue to rise and availability problems or shortages are expected to develop.

SUMMARY OF THE INVENTION

The invention provides an improved floor construction intended to replace conventional oak floors in vehicle bodies without sacrificing the particular advantages that oak (or a comparable wood species) provide and without suffering from the disadvantages of prior art floor constructions made of materials other than oak. The improved floor construction employs materials that are more readily available than oak (or other suitable wood replacements for oak), and therefore addresses the problems associated with possible shortages of oak. The replacement material employed in the improved floor construction also provides the strength and durability of oak floor board constructions, adequate fastener holding ability, and acceptable weight. Further, it is believed that the components of the improved floor construction can currently be manufactured at about the same cost as oak floor boards and that those components will become increasingly cost effective as the price of oak climbs.

In particular, the improved floor construction includes a interfitting floor boards, at least some of which are made of a material or materials that are more readily available than oak. The replacement floor boards can, if desired, readily be shaped to match conventional oak floor boards now in use to directly replace those oak floor boards, and the replacement floor boards can be installed in the same manner as oak floor boards so installation time and labor are comparable to that required for oak boards.

In one embodiment, the replacement floor boards each include a core member that is encased or encapsulated within a fiber reinforced plastic composite shell. A primary requirement of the core member is that it provide shear strength necessary to assure that the replacement floor board can carry the loads imposed on its surface during a normal working life, and the shell reinforces and seals the core member. A preferred method for forming the foregoing replacement boards involves co-pultrusion of the core member and the fiber reinforced plastic composite material.

More particularly, the invention provides a trailer including a wheel assembly and a platform mounted on the wheel assembly. The platform includes a floor assembly having overlapping floor boards. One or more of the floor boards includes a core member made of a wooden material and a shell made of a non-metallic plastic material, the shell including opposite sheet portions sandwiching the core member.

The invention also provides a floor assembly for a cargo transport vehicle body. The floor assembly includes a plurality of overlapping floor boards, at least one of which includes a core member made of a first material, and a fiber reinforced plastic composite material encapsulating the core member on four sides and being bonded to the core member on four sides. The fiber reinforced plastic composite material is different from the first material, and the fiber reinforced plastic composite material forms a seamless, unitary shell around the core member.

The invention also provides a cargo transport vehicle body including a top wall, a pair of opposite side walls extending downwardly from the top wall, and a bottom wall extending between the opposite side walls. The bottom wall includes a floor assembly having a first set of floor boards each including a core member made of a first material and a shell made of a fiber reinforced plastic composite material encapsulating the core member on four sides. The floor assembly also includes a second set of floor boards each made of a material different from the first material and different from the fiber reinforced plastic composite material, each of the floor boards of the first and second sets of floor boards abutting another of the floor boards.

The invention further provides a method of making a floor assembly including the steps of providing a core member and a plastic composite material, co-pultruding the core member and the plastic composite member to form a floor board, the plastic composite material forming a shell to encapsulate the core member on four sides, and positioning the floor board in overlapping relation with other floor boards.

Other features and advantages of the invention will become apparent to those skilled in the art upon review of the following detailed description, claims and drawings.

BRIEF DESCRIPTION OF THE DRAWINGS

FIG. 1 is a side elevational view of trailer embodying features of the invention.

FIG. 2 is an enlarged cross-sectional view taken along line 2—2 in FIG. 1 and illustrates a floor assembly in accordance with the invention.

FIG. 3 is an enlarged view of one of the edge boards used in the floor assembly illustrated in FIG. 2.

FIG. 4 is an enlarged view of one of the center boards used in the floor assembly illustrated in FIG. 2.

FIG. 5 is a view similar to FIG. 2 and illustrates a modified floor assembly.

FIG. 6 is a lateral cross-sectional view of an alternative floor board construction.

FIG. 7 is a lateral cross-sectional view of a second alternative floor board construction.

FIG. 8 is a cross-sectional view similar to FIGS. 2 and 3 and illustrates a floor assembly in accordance with a second embodiment of the invention.

FIG. 9 is a partially cutaway enlarged perspective view of one of the center boards used in the floor assembly illustrated in FIG. 8.

FIG. 10 is a lateral cross-sectional view of an alternative edge board for the floor assembly of FIG. 8.

FIG. 11 is a lateral cross-sectional view of an alternative center board for the floor assembly of FIG. 8.

Before embodiments of the invention are explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF PREFERRED EMBODIMENTS

Illustrated in FIG. 1 is a cargo transport vehicle 10 which in the illustrated embodiment is a semi-trailer adapted to be hauled over the road by a tractor (not shown). The trailer 10 includes a wheel assembly 12 comprising a suspension 14 and wheels 16 mounted on the suspension 14.

The trailer 10 also includes a body 18 that is mounted on the wheel assembly 12 in a manner known to those skilled in the art. The trailer body 18 includes a top wall 20 and a pair of opposite side walls 22 (only one of which is shown in FIG. 1) extending downwardly from the top wall 20. The side walls 22 are mirror images of each other and each includes (FIG. 2) a lower rail 24. The trailer body 18 also includes a platform or bottom wall 26 extending between the opposite side of walls 22. As shown in FIG. 2, the bottom wall 26 includes a plurality of steel I-beam crossmembers 28 (only one is shown) that extend laterally across the width of the trailer body 18 to support a trailer floor, as is explained more fully below. Each of the crossmembers 28 is secured to the lower rails 24 in a manner known in the art. In prior art arrangements, a floor constructed of overlapped oak floor boards (not shown) is installed over the crossmembers 28.

To this point the construction of the trailer 10 is conventional and is well known to those skilled in the art. To replace prior art floor constructions made of oak floor boards, Applicants have developed a novel floor assembly 34 that embodies the invention and that serves as a direct substitute for those prior art constructions. The floor assembly 34 includes a plurality of longitudinally extending floor boards. In the arrangement shown in FIG. 2, the floor boards include opposite edge boards 36.

As shown in FIG. 3, each of the edge boards 36 includes a core member 38. While the core member 38 can be made of a variety of materials including engineered plastics, for example, in a preferred embodiment the core member 38 includes wood material that is substantially less expensive than oak. Examples of suitable wood materials include chip or fiber board and parallel strand or oriented strand board (OSB). In a preferred embodiment, engineered lumber sold under the name PARALLAM is used for the core member 38.

Each of the edge boards 36 also includes a shell 40 that is preferably made of fiber reinforced plastic composite material which forms sheets or skins over the surfaces of the core member 38. The fiber reinforced plastic composite material includes filamentary material, such as glass fibers known as E-glass fibers for example, and a polyester resin. It is desirable that the resin material be selected to provide a solid bond between the core member 38 and the shell 40. Suitable resin materials include polyetheleneterphthalate (PET) and polyvinylchloride (PVC).

The edge boards 36 are preferably formed using the pultrusion process which is explained in U.S. Pat. No. 3,769,127 issued Oct. 30, 1973 to Goldsworthy, et al., and U.S. Pat. No. 3,556,888 issued Jan. 19, 1971 and U.S. Pat. No. 2,871,911 issued Feb. 3, 1959, both to Goldsworthy, all of which are incorporated herein by reference. The pultrusion process involves passing fibrous material through a resin bath and pulling the resulting composite through a die wherein the material is formed into the desired shape and cured. Thereafter the resulting continuous pultruded product is cut to desired lengths.

To form the edge boards 36, a core member 38 is co-pultruded with the fiber reinforced plastic composite material to form the shell 40. Co-pultrusion is accomplished by drawing the core member 38 and the filamentary material through a resin bath and then through a die to form an edge board pultrusion that is cut to desired lengths to form the edge boards 36. When formed in this way the shell 40 forms a seamless and unitary skin that integrally bonds to the core member 38. In a preferred embodiment, the shell 40 completely encases or encapsulates the core member 38 on all four sides to seal and protect the core member 38. Because the core member 38 is sealed by the shell 40, expansion and contraction of the core member 38 due to environmental conditions such as humidity are reduced or eliminated. In this respect the edge boards 36 (and other co-pultruded boards) are expected to provide improved performance over comparable prior art oak floor boards which, when warped or distorted, can leave discontinuities in the planar surface of the floor or potential gaps or leak sites between adjacent floor boards.

As shown in FIG. 2, the floor assembly 34 also include center boards 42. In the illustrated arrangement the center boards 42 have a different cross-sectional shape than the edge boards 36 but are otherwise constructed of the same materials and made in the same way (i.e., via co-pultrusion) as the edge boards 36. As shown in FIG. 4, each of the center boards 42 includes a core member 44 and a shell 46 that encapsulates the core member 44 on four sides and that forms a seamless, unitary skin for the core member 44.

In the illustrated embodiment the floor assembly 34 includes two edge boards 36 and six center boards 42 arranged so that the floor assembly 34 is suitable for a trailer with an outside width of about 102 inches. However, one skilled in the art will recognize that the number and/or size of the floor boards 36 and 42 can vary depending upon the desired size of the floor assembly 34.

As shown in FIG. 2 the edge boards 36 and center boards 42 are laid up to interfit with one another. To facilitate their lay-up, each of the edge boards 36 and center boards 42 also includes overlap means for interfitting with an adjacent floor board. In the particular arrangement illustrated in the drawings (see FIGS. 3 and 4), the edge boards 36 and the center boards 42 are provided with at least one rabbetted edge 50. The rabbetted edge 50 forms corresponding tongue and groove portions 52 and 54 that fit with corresponding tongue and groove portions 52 and 54 on an adjacent floor board to form a single lap joint 55 (FIG. 2). The groove portion 54 is provided with a longitudinally extending bead 56 for reasons known to those skilled in the art.

In the illustrated arrangement, the edge boards 36 are also configured to fit with the lower rails 24. In this regard, each of the edge boards 36 is formed with a notch 58 (FIG. 3) on its underside. The notch 58 is configured to overlay a portion of the lower rail 24 as shown in FIG. 2.

After being laid up in overlapping relation, the edge boards 36 and center boards 42 are screwed or otherwise fastened in place on the crossmembers 28 with suitable fasteners 59 (only one is shown). The material of the core members 38 and 44 provides the edge boards 36 and center boards 42 with good fastener-holding abilities.

To accommodate flexible conduit, air hoses and the like (not shown), the floor assembly 34 also includes a hat-shaped channel member 60. As viewed in FIG. 2, the channel member 60 is positioned between the left one of the edge boards 36 and the leftmost one of the center boards 42. However, the channel member 60 can be positioned elsewhere in the floor assembly 34, as desired.

In the embodiment illustrated in FIG. 2, conventional oak floor boards are replaced entirely by the edge boards 36 and the center boards 42. That embodiment, as shown in FIG. 5, can be modified such that only selected oak floor boards are replaced with the edge and/or center boards 36 and 42. In the arrangement of FIG. 5, only two center boards 42 are used and the remaining center boards are oak center boards 62. In that arrangement the amount of oak is reduced relative to prior art floor constructions and the oak boards 62 are readily nailable to secure cargo, such as wood pallets for example, in place.

As is apparent from FIGS. 2 and 5, the edge boards 36 and the center boards 42 are interchangeable with oak floor boards. Non-oak interchangeable floor boards can also be made of other materials or configured differently from the edge and center boards 36 and 42 as exemplified in FIGS. 6 and 7. In particular, illustrated in FIG. 6 is an alternative center board 64 including a pair of laterally offset core members 66 that are co-pultruded with fiber reinforced plastic composite material to form a shell 68 around the core members 66. The shell 68 provides a middle sheet section 70 that bonds the core members 66 together, and the offset core members 66 form rabbetted edges 72.

Illustrated in FIG. 7 is a second alternative center board 74 that is made entirely of a pultruded fiber reinforced plastic composite material. If the center board 74 is incorporated into a floor assembly it is desirable to secure that board in position with adhesives applied over the rabbetted edges 76 thereof. A suitable adhesive is a methacrylate adhesive sold by ITW Adhesive Systems of Farmington Hills, Mich. as Model No. A0420. If desired, the space within the center board 74 could be filled with a structural foam material or other suitable material to impart enhanced structural properties to the center board 74.

Illustrated in FIG. 8 is a floor assembly 78 in accordance with a second embodiment of the invention. The floor assembly 78 includes a pair of floor boards 80 that are each preferably formed via co-pultrusion. As shown in FIG. 9, each of the floor boards 80 includes a desired number (12 in the illustrated arrangement) of core members 82 which are made of the same material as core members 38 and 44. Each of the floor boards 80 also includes a shell 84 that encapsulates all of its core members 82. The shell 84 forms an upper floor surface 86. To recess fasteners 88 (only one is shown in FIG. 9) used to secure the floor boards 80 in place, recessed areas or channel portions 90 are also formed in the shell 84 between selected ones of the core members 82. Each of the floor boards 80 also includes opposite rabbeted edge portions 92 provided with longitudinally extending beads 94.

The floor assembly 78 also includes opposite edge boards 96 and a center board 98. In the embodiment illustrated in FIG. 8 the edge boards 96 and the center board 98 are made of oak to provide nailability for cargo securement. Those oak boards could in other embodiments be replaced with alternative floor boards. For example, illustrated in FIG. 10 is an edge board 100 that is interchangeable with edge board 96. Edge board 100 is also preferably formed by co-pultrusion and includes three core members 102 and a shell 104 encapsulating those core members 102. The shell 104 forms channels 106 for the receipt of fasteners (not shown) or for the receipt of a wood block 108 (shown schematically). The block 108 can be adhesively bonded in place and is nailable for cargo securement purposes. The edge board 100 also includes a rabbeted edge 110 to interface with one of the floor boards 80 and a tongue edge portion 112 to interface with a channel 114 in a modified lower rail 116.

Illustrated in FIG. 11, is a center board 118 that is interchangeable with center board 98. The center board 118 is also preferably co-pultruded and includes four core members 120 and a shell 122. The shell 122 forms channels 124 for the receipt of fasteners (not shown) or a nailable wood block 126 (shown schematically). Each of the center boards 118 also includes rabbeted edges 128 to interface with the floor boards 80.

While in the illustrated arrangement the trailer body 18 is a box-like structure defining an enclosed cargo-receiving interior (not shown), the trailer body 18 could have other constructions, such as an open top trailer or a flatbed for example, without departing from the invention.

It should also be understood that while the illustrated cargo transport vehicle is a trailer 10 and the vehicle body is a trailer body 18, floor assemblies in accordance with the invention can be employed in various cargo transport vehicle bodies, such as truck bodies, intermodal shipping containers and rail car bodies, for example.

Advantageously, the improved floor construction concepts presented above provide direct substitutes for oak floor board constructions in performance and installation while avoiding disadvantages associated with prior art floor constructions intended to replace oak floor constructions.

Various features of the invention are set forth in the following claims.

We claim:

1. A trailer comprising:

a wheel assembly, and a platform mounted on the wheel assembly, the platform including a floor assembly, the floor assembly including a plurality of floor boards, one of the floor boards including a substantially rigid core member made of a wooden material, and a shell made of a non-metallic plastic material, the shell including opposite sheet portions sandwiching the core member.

2. A trailer as set forth in claim 1 wherein the non-metallic plastic material is a plastic composite material including a filamentary material and a resin material, and wherein the core member and the shell are co-pultruded so that the shell forms a unitary skin around the core member.

3. A trailer as set forth in claim 1 wherein each of the floor boards overlaps at least one other floor board.

4. A trailer as set forth in claim 1 wherein the plurality of floor boards includes a first set of floor boards, the first set of floor boards including said one of the floor boards, and additional floor boards each including a core member made of a wooden material, and a shell made of a non-metallic plastic material, the shell encapsulating the core member on four sides.

5. A trailer as set forth in claim 4 wherein the plurality of floor boards includes a second set of floor boards, each of the floor boards of the second set of floor boards being made of a material different the from the materials of the floor boards in the first set of floor boards.

6. A trailer as set forth in claim 1 wherein the shell encapsulates the core member on four sides.

7. A trailer as set forth in claim 6 wherein said one of the floor boards includes an upper surface, and an additional core member, the additional core member being encapsulated on four sides by the shell, and wherein the core members are spaced apart so that the shell forms a recessed area between the core members, the recessed area being adapted to receive fasteners so that the fasteners are recessed below the upper surface.

8. A trailer as set forth in claim 7 wherein the non-metallic plastic material is a plastic composite material including a filamentary material and a resin material.

9. A floor assembly for a cargo transport vehicle body, the floor assembly comprising:

a plurality of overlapping floor boards, one of the floor boards including a core member made of a first material, and a fiber reinforced plastic composite material encapsulating the core member on four sides and being bonded to the core member on four sides, the fiber reinforced plastic composite material being different from the first material, wherein the core member and the fiber reinforced plastic composite material are co-pultruded so that the fiber reinforced plastic composite material forms a seamless, unitary shell around the core member.

10. A floor assembly as set forth in claim 9 wherein the core member and the shell are co-pultruded so that the core member and the shell are bonded together.

11. A floor assembly as set forth in claim 9 wherein the plurality of floor boards includes a first set of floor boards, the first set of floor boards including said one of the floor boards, and additional floor boards each including a core member made of the first material, and a fiber reinforced plastic composite material encapsulating said core member on four sides and being bonded thereto on four sides, the fiber reinforced plastic composite material in each of the additional floor boards being different from the first material, wherein the core member and the fiber reinforced plastic composite material of each of the additional boards are co-pultruded so that the fiber reinforced plastic composite material forms a seamless, unitary shell around the core member thereof.

12. A floor assembly as set forth in claim 11 wherein the plurality of floor boards includes a second set of floor boards, each of the floor boards of the second set of floor boards being made of a second material, the second material being different the from the first material, and the second material being different from the fiber reinforced plastic composite material of each of the floor boards of the first set of floor boards.

13. A floor assembly as set forth in claim 12 wherein the first material includes a wood material.

14. A floor assembly as set forth in claim 9 wherein said one of the floor boards includes an upper surface, and an additional core member, the additional core member being encapsulated on four sides by the fiber reinforced plastic composite material so that the fiber reinforced plastic composite material forms a shell around the additional core member, and wherein the core members are spaced apart so that the fiber reinforced plastic composite material forms a recessed area between the core members, the recessed area being adapted to receive fasteners so that the fasteners are recessed below the upper surface.

15. A cargo transport vehicle body comprising:

a top wall, a pair of opposite side walls extending downwardly from the top wall, and a bottom wall extending between the opposite side walls, the bottom wall including a floor assembly, the floor assembly including a first set of floor boards, each of the floor boards in the first set of floor boards including a core member made of a first material, and a shell made of a fiber reinforced plastic composite material encapsulating the core member on four sides, and the floor assembly including a second set of floor boards, the second set of floor boards being made of a material different from the first material and different from the fiber reinforced plastic composite material, each of the floor boards of the first and second sets of floor boards abutting another of the floor boards.

16. A cargo transport vehicle body as set forth in claim 15 wherein each of the floor boards of the first and second sets of floor boards interfits in overlapping relation with another of the floor boards.

17. A cargo transport vehicle body as set forth in claim 15 wherein the core member and the shell of each of the floor boards of the first set of floor boards are co-pultruded so that said shell forms a unitary skin around said core member.

18. A cargo transport vehicle body as set forth in claim 15 wherein each of the floor boards in the first set of floor boards includes an upper surface, and an additional core member, the additional core member of each of the floor boards of the first set of floor boards being encapsulated on four sides by the shell thereof, and wherein the core members of each of the floor boards of the first set of floor boards are spaced apart so that the shell thereof forms a recessed area between said core members, the recessed area being adapted to receive fasteners.

19. A method of making a floor assembly for a cargo transport vehicle, said method comprising the steps of:

providing a core member, and a plastic composite material, co-pultruding the core member and the plastic composite material to form a floor board, the plastic composite material forming a shell to encapsulate the core member on four sides, and positioning the floor board in overlapping relation with other floor boards.

* * * * *